United States Patent [19]
Jäger

[11] Patent Number: 5,536,137
[45] Date of Patent: Jul. 16, 1996

[54] HANDLING SYSTEM AND METHOD

[75] Inventor: Helmut Jäger, Königsbach-Stein, Germany

[73] Assignee: Felsomat GmbH & Co. KG, Donigsbach-Stein, Germany

[21] Appl. No.: 404,341

[22] Filed: Mar. 15, 1995

[30] Foreign Application Priority Data

Mar. 21, 1994 [DE] Germany ................ 44 09 532.5

[51] Int. Cl.⁶ .................................................. B65H 29/00
[52] U.S. Cl. .................. 414/788.7; 414/331; 414/786; 414/792.8; 414/792.9
[58] Field of Search ................................ 414/331, 786, 414/788.7, 792.9, 795.8; 901/7

[56] References Cited

U.S. PATENT DOCUMENTS

| | | | |
|---|---|---|---|
| 2,718,972 | 9/1955 | Temple | 414/331 |
| 4,180,361 | 12/1979 | Longinotti | 414/788.7 |
| 4,588,341 | 5/1986 | Motoda | 414/331 |
| 4,621,967 | 11/1986 | Masada | 414/331 |
| 4,946,340 | 8/1990 | Murphy et al. | 414/795.8 |
| 5,355,579 | 10/1994 | Miyasaka et al. | 414/788.7 |
| 5,358,375 | 10/1994 | Kawada et al. | 414/331 |

FOREIGN PATENT DOCUMENTS

0240812A  10/1987  European Pat. Off. ........... 414/792.9

*Primary Examiner*—David A. Bucci
*Assistant Examiner*—Douglas Hess
*Attorney, Agent, or Firm*—Claude A. S. Hamrick

[57] ABSTRACT

The invention proposes a handling system and method for feeding workpieces to a subsequent machining unit having a working area which is enclosed toward the outside by a protective wall and in which a stack presentation device, preferably configured as a pallet transfer device, is provided for presenting workpiece carriers with unmachined workpieces and for receiving workpiece carriers after the machine operation. A loading device is assigned to the stack presentation device for receiving workpieces and for delivering them to the subsequent machining unit. Feeding the workpiece carriers into the working area is effected by a stack-changing device, preferably designed as a rotary table having an H-shaped rotary frame into which the workpiece carrier stacks can be introduced on trolleys. In the area of the stack-changing device, the rotary table comprises a protective wall section which separates the working area completely from the loading area so that a change of the workpiece carrier stacks can be carried out in the loading area without any risk, while the workpiece carriers are being processed in the working area.

33 Claims, 2 Drawing Sheets

HANDLING SYSTEM AND METHOD

BACKGROUND OF THE INVENTION

The present invention relates to a handling system for feeding workpieces to a subsequent machining unit having a working area which is enclosed toward the outside by a protective wall and in which a stack presentation device is provided for presenting workpiece carriers with unmachined workpieces and for receiving workpiece carriers after the machining operation, and having a loading device assigned to the stack presentation device for delivering unmachined workpieces and for receiving workpieces after the machining operation.

Handling systems of this kind are principally known and are used for loading machine tools and the like. The stack presentation devices used in such systems normally consist of a pallet transfer system with two controlled axes in the horizontal and vertical directions to which workpiece carriers with unmachined workpieces can be fed via a conveyor from a space outside the working area while workpiece carriers with machined workpieces can be removed from the working area via another conveyor. Workpieces present in the stack presentation device are normally transferred to the loading device, which latter in most of the cases is configured as a gantry, from where the workpieces can be picked up one by one by means of grippers or the like and can be fed from the loading device to the subsequent machining unit, for example a machine tool. Upon completion of the machining operation, the machined workpieces are picked up again by the loading device and deposited on the workpiece carrier of the stack presentation device. The workpiece carriers, together with the machined workpieces, are then removed again from the working area via the conveyor.

It has been found to be a disadvantage of such handling systems that every time the workpiece carrier stack with the unmachined workpieces has been fully worked off in the working area, new workpiece carriers containing unmachined workpieces have to be fed in by means of the conveyor in order to avoid stoppages. This requires constant monitoring of the handling system and permits only limited automation of the process.

SUMMARY OF THE INVENTION

Now, it is the object of the present invention to provide an improved handling system for feeding workpieces to a subsequent machining unit which permits a high degree of automation and low-cost operation. At the same, the invention is to provide a compact design and to reduce the need for constant operator monitoring.

Another object of the invention is to provide an improved method for handling workpieces to be fed to a subsequent machining unit, by which the afore-mentioned disadvantages are avoided.

The object of the invention is achieved by a handling system for feeding workpieces to a subsequent machining unit having a working area which is enclosed toward the outside by a protective wall and in which a stack presentation device is provided for presenting workpiece carriers with unmachined workpieces and for receiving workpiece carriers after the machining operation, having a loading device assigned to the stack presentation device for delivering unmachined workpieces and for receiving workpieces after the machining operation and having a stack-changing unit for feeding workpiece carrier stacks with unmachined workpieces to the stack presentation device and for removing workpiece carrier stacks from the stack presentation device after the machining operation, the stack-changing unit having a first area within the working area for presenting workpiece carrier stacks to the stack presentation device, and a second area forming a loading space outside the working area for feeding in and removing workpiece carrier stacks from the outside.

The invention, therefore, couples a stack presentation device located inside a working area, to which a loading device is assigned for transferring the workpieces or workpiece carriers to a subsequent machining unit, with a stack presentation device for feeding in workpiece carrier stacks. The stack-changing unit comprises a first area within the working area for presenting workpiece carrier stacks to the stack presentation device, and a second area outside the working area where workpiece carrier stacks can be fed in from the outside.

Instead of conveying individual workpiece carriers or pallets to the stack presentation device by means of a conveyor within the working area, the invention now provides that workpiece carrier stacks are fed in from the outside into the second area of the stack-changing unit in the loading space, so that once the workpiece carrier stacks in the working area have been worked off, they can be transferred from the loading space into the working area so that another stack of workpiece carriers is available to the stack presentation device in the working area, with the result that stoppages are avoided and a high degree of decoupling is achieved.

In large-series production, where a plurality of machining units, for example machining centers, have to be supplied with workpieces and are in addition themselves coupled with a plurality of other machining units, the workpiece transfer between the different machining units is conventionally effected by means of conveyors and loading gantries. This results in very close coupling of the different machining units via cycle-controlled belts so that if a single machining unit stops, the entire plant necessarily will stop within very short time.

The handling system according to the invention largely avoids the risk of stoppages of a larger overall system as due to the stack-changing unit, which acts as sort of a buffer, there is always a larger number of workpiece carriers available in the feeding device for the subsequent machining units. These additional buffers, which thanks to the compact structure do not require any additional space, considerably reduce the risk of unwanted stoppages of the whole system so that the overall utilization rate of a parts production system can be considerably improved. This has the result that in the case of a larger production plant, the total number of machining units can be reduced due to the improved overall utilization rates so that altogether considerable cost savings can be achieved and the required space can be reduced, too. In addition, the number of staff required is also reduced as a plurality of handling systems according to the invention can be used as compact cells for coupling the different machining units, in which case manual intervention will be required only after an entire workpiece carrier stack of one handling system has been worked off and a new workpiece carrier stack has to be fed in from the outside.

According to an advantageous further development of the invention the stack-changing unit comprises a rotary table, with vertically extending axis, for transferring the workpiece carriers between the first and the second areas.

This enables a particularly simple transfer of the workpiece carrier stacks to be achieved between the first and the second areas, and in addition the space requirement of the stack-changing unit is especially small and a high degree of reliability is ensured.

According to a convenient further development of the invention, the working area is delimited in the area of the stack-changing unit by a section of a protective wall which is connected with the rotary table and mounted for rotation therewith.

This arrangement provides the enclosure of the working area to the outside, which is necessary for accident prevention reasons, in a particularly simple and cost-saving way and guarantees at the same time a high degree of reliability.

According to an advantageous further development of the invention, the loading space is separated from the outside by a second protective wall comprising at least one loading door through which workpiece carrier stacks can be loaded and unloaded, and the rotary table is coupled with a locking means so that the loading door can be opened from the outside only in the closed condition of the protective wall section.

As a result of these measures, decoupling of the working area from the loading area is achieved so that the loading door can be opened from the outside for the exchange of workpiece carrier stacks only when safe separation between the working area and the loading area is ensured by the locking means so that the working area is completely closed by the protective wall section in the area of the stack-changing unit. This guarantees complete accident prevention in any phase of the machining operation, and enables at the same time an exchange of workpiece carrier stacks to be effected easily and in a time-saving way within the loading area, while workpiece carrier stacks are being handled within the working area.

According to another advantageous embodiment of the invention, the workpiece carriers are disposed in the stack-changing unit on trolleys that can be displaced on the floor between the first and the second areas by means of the rotary table.

This feature provides the advantage that the weight of the workpiece carrier and the workpieces contained thereon does not have to be supported by the rotary table, but is transmitted by the trolleys directly to the floor. The rotary table, therefore, only has to provide a lateral support for the workpiece carrier stacks and to permit their transportation during rotation. This enables a particularly simple and low-cost structure to be achieved.

According to another advantageous embodiment of the invention the rotary table is configured as a H-shaped rotary frame comprising a common central section and two U-shaped sections projecting from the central section to the outside.

This feature provides the advantage that it enables the trolleys, with the workpiece carrier stacks disposed thereon, to be simply rolled into or out of the U-shaped section in the loading area, the rolling-in step being completed by a locking operation so that later, when the workpiece carrier stacks have to be transferred between the first and the second areas, the operating sequence can be carried out automatically.

A further advantageous development of the invention provides that the stack presentation device, the stack-changing unit, the protective wall and the second protective wall are mounted on a common frame.

Additionally, the frame may in this case also support the loading devices which may be configured, for example, as a loading gantry or as a robot.

This feature has the result to give the handling system according to the invention the structure of a compact automation cell in which automatic handling of the workpieces and/or the workpiece carrier stacks is guaranteed while at the same time complete separation from the outside is achieved for accident prevention purposes.

In addition, further equipment, such as a switchgear cabinet and an operator control panel, may also be integrated in the compact automation cell so formed in order to achieve an especially space-saving and compact structure.

According to an advantageous further development of the invention, means for introducing and for removing workpieces from the working area are additionally provided. This enables individual workpieces to be introduced or removed from the working area during the machining operation for checking purposes.

According to another embodiment of the invention, the stack presentation device is configured as a pallet transfer device comprising an extension arm, that can be moved in vertical and in horizontal direction, with a first link on which a second link is drivingly and positively coupled in such a way that when the first link is rotated, the free end of the second link describes a path comprised of essentially linear horizontal and vertical sections.

One achieves in this way a particularly simple and compact structure, especially in connection with a design where the stack-changing unit comprises a rotary table.

An advantageous further development of the invention provides that a plurality of machining units are coupled with the loading device.

In this manner, the advantageous buffer capacity of the handling system according to the invention can be utilized simultaneously for a plurality of machining units, the high handling speed provided by the handling system according to the invention permitting in most of the cases, without and difficulty, the simultaneous supply of several machining units.

According to a variant of the invention, the handling system can be coupled with one or more machining units designed as storage means for storing unmachined workpieces or workpiece carriers containing unmachined workpieces.

This enables a handling system according to the invention to be used, for example, for loading workpieces onto an annealing line, in which case only unmachined workpieces or workpiece carriers with unmachined workpieces are fed to the line, and the empty workpiece carriers are taken over again by the stack-changing unit.

The reverse case is also possible. The object of the invention is further achieved by a method comprising the following steps:

(a) Feeding a plurality of workpiece carriers, containing unmachined workpieces and being stacked one on top of the other, to a loading/unloading position of the stack-changing unit;

(b) transferring the stacked workpiece carriers from the loading/unloading position to a stack-presentation position for the subsequent stack presentation device;

(c) re-stacking all workpiece carriers from the stack-presentation position of the stack presentation device to a waiting position of the stack presentation device in a free location;

(d) picking up a workpiece carrier from the waiting position and transferring it to a feeding position for a loading device;

(e) transferring a workpiece from the feeding position to a subsequent machining unit, by means of the loading device;

(f) upon completion of the machining operation, picking up the workpiece from the loading device in the feeding position by the stack presentation device;

(g) repeating the steps (e) to (f) until all workpieces of a workpiece carrier have been worked off;

(h) transferring the workpiece carrier, with the machined workpieces, to the stack-presentation position of the stack-changing unit;

(i) repeating the steps (d) to (h) until all workpiece carriers have been re-stacked from the waiting position to the stack presentation position;

(j) transferring the workpiece carriers, with the machined workpieces, from the stack-presentation position to the loading/unloading position of the stack-changing unit.

According to the invention, therefore, a plurality of workpiece carriers, stacked one on top of the other, is at first moved into the stack-changing unit in the loading/unloading position and is then transferred to a stack-presentation position. Thereafter, all workpiece carriers are at first re-stacked to a waiting position, by means of the stack presentation device, in order to create free space in the stack-presentation position. Thereafter, the stacked workpiece carriers are worked off one by one from the waiting position and stacked back to the stack-presentation position, by transferring one workpiece carrier from the waiting position to a feeding position for the loading device, delivering thereafter the workpieces one by one, by means of the loading device, to a subsequent machining unit for machining, and transporting the machined workpieces back onto the workpiece carrier until all workpieces have been machined, whereafter the workpiece carrier is stacked back to the waiting position. The remaining workpiece carriers are then worked off one by one from top to bottom, and stacked back to the waiting position. After all workpieces of the stacked workpiece carriers have been machined and stacked back to the waiting position, the workpiece carrier stack is retransferred by means of the stack-changing unit to the loading/unloading position and is then ready for being exchanged against a workpiece carrier stack containing unmachined workpieces.

According to a variant of the before-described method, the step of re-stacking the workpiece carriers from a stack-presentation position to the waiting position is omitted; instead, the workpiece carriers are transferred directly from the stack-presentation position to the feeding position for the loading device, and only part of the workpieces, preferably half of the workpieces, are machined. Thereafter, the workpiece carriers are transferred from the feeding position to the waiting position by means of the stack presentation device. This operation is repeated until all workpiece carriers have been re-stacked from the stack-presentation position to the waiting position, after machining of part of the workpieces in the feeding position. The workpiece carriers are then once more transferred one by one to the feeding position, and then the rest of the workpieces is machined. When machining of all workpieces in the feeding position is finished, the respective workpiece carrier is stacked back to the stack-presentation position, and the next workpiece carrier is picked up from the workpiece carrier stack in the waiting position, transferred to the feeding position and, after machining of the workpieces, deposited again in the stack-presentation position. The rest of the operation corresponds to the method described before.

This variant offers the advantage that due to the omission of the re-stacking operation less time is lost at the beginning of the handling operation so that in some situations the total time required for handling and machining of the workpieces can be reduced.

According to certain further variants of the methods described above, it is not individual workpieces that are transferred to the loading device in the feeding position, but rather an entire workpiece carrier, i.e. a pallet or the like, on which a plurality of workpieces are deposited. For the rest, these two variants are identical to the methods described above.

Transferring an entire workpiece carrier, instead of individual workpieces, to the machining operation may prove to be advantageous if the machining units themselves are equipped with suitable handling systems that enable them to work off one by one the different workpieces contained on a workpiece carrier.

According to another variant of the methods described above, the workpieces are picked up by the loading device from the workpiece carriers in the feeding position, and are transferred to a subsequent machining or storage unit, and the empty workpiece carriers are stacked back to the stack-presentation position.

In this case, the method according to the invention can be used merely for loading workpieces or workpiece carriers onto, for example, a storage unit, a transfer line, an annealing line, or the like, while the workpiece carriers are stacked back in empty condition.

It is evident that the reverse case is also possible, namely that workpieces can be removed from a storage unit, a transfer line or a machining unit for being deposited on previously empty workpiece carriers.

According to the method according to the invention, the loading device may advantageously be coupled to a plurality of machining or storage units to which the workpieces or workpiece carriers are selectively supplied.

According to a further advantageous embodiment of the method according to the invention, the stacked workpiece carriers are transferred between the loading/unloading position and the stack-presentation position by a rotary movement about a vertical axis.

According to another embodiment of the invention, the workpiece carriers are moved on trolleys in the stack-changing units.

This enables the trolleys, which are anyway used for transporting the workpiece carrier stacks, to be used with advantage also in the stack-changing unit so that the weight of the workpiece carrier stack does not have to be supported by the stack-changing unit itself.

It is understood that the features mentioned above and those yet to be explained below can be used not only in the respective combinations indicated, but also in other combinations or in isolation, without leaving the context of the present invention.

SHORT DESCRIPTION OF THE DRAWINGS

Other features and advantages of the invention will become apparent from the following description of a preferred exemplary embodiment of the invention, with reference to the drawings, in which.

DESCRIPTION OF THE PREFERRED EMBODIMENTS

Figure 1:
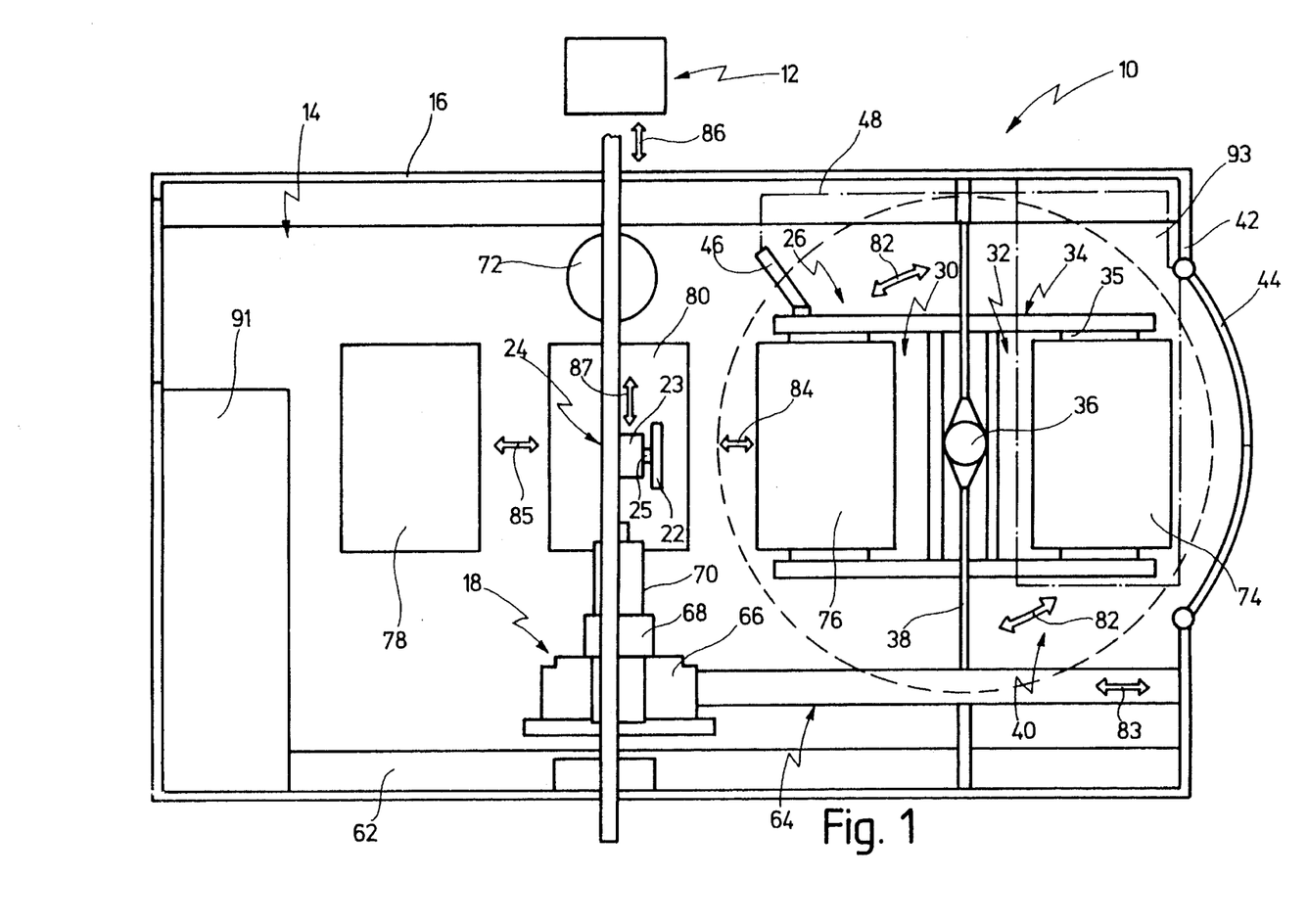
FIG. 1 shows a simplified, very diagrammatic top view of a handling system according to the invention.
Figure 2:
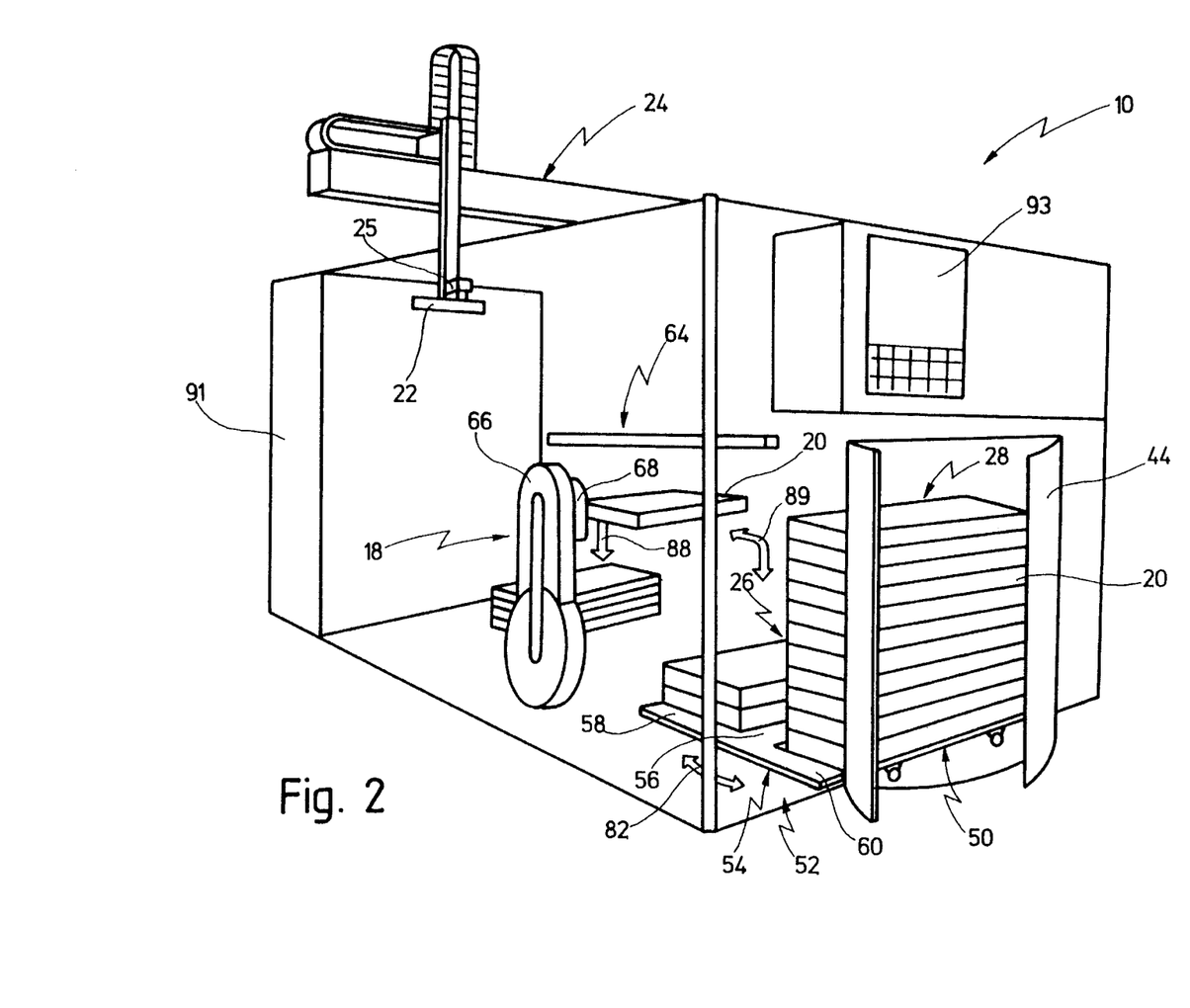
FIG. 2 shows a simplified, perspective view of the handling system according to FIG. 1.

In FIGS. 1 and 2 a handling system according to the invention is generally indicated by reference numeral 10.

The different components of the handling system 10 are mounted on a common frame 62. There is further provided on the frame 62 an outer protective wall 16 which separates the working area 14 from the outside.

The working area 14 is separated, by a protective wall section 38 and in a manner that will be described in more detail further below, from a loading area 40 that is separated from the outside by a second protective wall 42 provided with two outwardly opening curved loading doors 44.

Inside the working area 14, there is provided a stack presentation device 18 which takes the form of a pallet transfer device according to DE 93 10 533 U1. Accordingly, the stack presentation device 18 comprises an extension arm, that can be moved in vertical and in horizontal direction, equipped with a first link 66 to which a second link 68 is drivingly and positively coupled in such a way that when the first link 66 rotates the free end 70 of the second link 68 describes a locus with substantially linear horizontal and vertical sections.

The stack presentation device 18, therefore, requires only one controlled axis and is capable of picking up individual workpiece carriers 20 from a first workpiece carrier stack, moving them upward and then further along a horizontal path, and depositing them finally on a different stack.

A loading device 24, illustrated only diagrammatically and taking the form of a loading gantry, is arranged above the cell, that is enclosed by the outer protective wall 16, and is equipped with a slide 23 which can be displaced along the loading gantry and which carries a gripper 25 that can be moved in vertical direction for picking up a workpiece 22.

Beside the stack presentation device 18, there is provided a stack-changing unit indicated generally by reference numeral 26. The stack-changing unit 26 comprises a first area 30 within the working area 14 and a second area 32 within the loading area 40, opposite the first area 30. The stack-changing unit 26 contains a rotary table 34 with a vertical axis 36, by means of which workpiece carriers 20 can be transferred between the first area 30 and the second area 32, by power-driven rotation about a vertical axis 36.

The rotary table 34 is configured as a H-shaped rotary frame 54 having a common central section 56 and two U-shaped sections 58, 60 each projecting from the central section to the outside.

As can be seen in FIG. 2, when the doors 44 of the second outer wall 42 are open, a workpiece carrier stack 28 can be introduced into the loading area 40 and into the U-shaped section of the rotary frame 54, and can be locked in place therein (not shown). During this operation, the workpiece carrier stack 28 is placed on a trolley 50 so that no additional transport means is required. The workpiece carrier stack 28 remains on the trolley 50 also during the transfer between the first area 30 and the second area 32 so that in sizing the rotary frame 54 only the lateral supporting forces of the rotary table have to be considered, while the weight of the workpiece carrier stack 28 and of the workpieces 22 can be omitted.

The working area 14 is completely separated from the outside by the outer protective wall 16 and delimited against the loading area 40 by the protective wall section 38 integrated on the rotary table.

The complete enclosure of the working area 14 guarantees in this way complete accident protection, as it excludes any access to the working area 14 from the outside during operation of the handling system 10. The protective wall section 38 is integrated on the rotary table 34 and separates the two U-shaped sections 58, 60 at the central section 56.

A locking device 46 assigned to the rotary table 34, which is coupled with the loading doors 44 via a connection line 48, ensures that the loading doors 44 can be opened from the outside only when the stack-changing unit 26 occupies the position illustrated in FIG. 1 in which the working area 14 is completely separated from the loading area 40 by the protective wall section 38 provided on the rotary table 34. It is ensured in this way that during operation of the handling system 10 the workpiece carrier stack 28 can be changed without any risk in the working area 14, with the loading doors 44 in open condition. When a workpiece carrier stack 28, placed on a trolley 50, is moved into the U-shaped section 60 of the rotary frame 54 and locked to the rotary frame 54 by a locking device indicated by reference numeral 35, the workpiece carrier stack 28 can be moved by rotation of the rotary table 34 by 180° from this loading/unloading position, illustrated in FIG. 1, to a stack-presentation position, indicated by reference numeral 76, inside the working area 14. Once this position is reached and the locking device 46 has been unlocked, the working area 14 is completely guarded from the working area 14 so that a workpiece carrier stack 28, with previously machined workpieces 22, can be removed from the loading area 40, after the loading doors 44 have been opened, for being exchanged against a workpiece carrier stack 28 containing unmachined workpieces 22.

When a workpiece carrier stack 28 has been transported into the stack-presentation position 76, by rotation of the rotary table 34 in the direction indicated by arrows 82, then workpieces 20 can be picked up from the workpiece carrier stack 28 in the stack-presentation position 76 using the stack presentation device 18, can be moved vertically upward (arrow 89) and then further in the direction of arrow 84 in FIG. 1 to a feeding position 80 below the loading device 24, or further in the direction of arrow 85 (FIG. 1) in horizontal direction and finally again in vertical direction (arrow 88) according to FIG. 2 downward for being put down in a waiting position 78 (FIG. 1) opposite the stack-presentation position 76. From the feeding position 80 individual workpieces 22, or complete workpiece carriers 20, can be taken over by means of the gripper 25 of the loading device 24 and can be transferred in the direction of arrows 86, 87 to a subsequent machining unit, indicated only schematically by reference numeral 12, where they can be machined and, upon completion of the machining operation, removed again by means of the loading device.

On the common frame, there are further mounted a switchgear cabinet 91 and an operator control unit 93 so that all in all a compact automation cell for the handling system is obtained.

Additionally, the automation cell may also comprise a device for treating or working workpieces, as indicated schematically by reference numeral 72. The working device in question may be, for example, a washing system. Below the loading device 24, there may further be arranged a working device, for example a water-jet cutting device in which case the movement of the workpiece through the loading device 24 is along two axes, namely in the direction of arrow 86 and in vertical direction, while the movement through the stack presentation device 18 is along a third horizontal axis, namely in the direction of arrows 84, 85.

The control of the entire handling system 10 is effected via the control unit 93 whose operator control panel is arranged above the loading doors 44, and is accessible from the outside.

In addition, the handling system 10 further comprises infeed and removal means, indicated diagrammatically by reference numeral 64 in FIGS. 1 and 2, by means of which individual workpieces 22 can be introduced into or removed from the working area 14 in the direction of arrow 83 through the loading area 40, for example for checking purposes.

As represented diagrammatically in FIG. 1, the handling system 10 may be coupled to a machining or storage unit 12, or else to a plurality of working or storage units, the connection being obtained through the loading device 24 which—to the extent possible—may also be mounted on the frame 62 or, if larger distances are to be bridged, may be mounted in an external place.

The operation of the handling system 10 is as follows:

To begin with, a workpiece carrier stack 28 containing unmachined workpieces 22 is moved on the trolley 50 into the U-shaped section 60 of the rotary table 34 and locked therein, with the loading doors 44 in open condition. When the operators have left the loading area 40, the loading doors 44 are closed from the outside and the rotary table 34 may be rotated in the direction of arrow 82 in order to bring the workpiece carrier stack 28 into the stack-presentation position 76 within the working area 14. Now, the entire workpiece carrier stack 28 can be re-stacked initially from the stack-presentation position 76 to the opposite waiting position 78, using the stack presentation device 18, in order to have more space at the stack-presentation position 76 for workpiece carriers 20 after machining of the workpieces 22.

In the case of this first variant of the method, no loading of the connected machining unit 12 with workpieces 22 or workpiece carriers 20 is possible during the time of this re-stacking operation from the stack-presentation position 76 to the waiting position 78. Upon completion of the re-stacking operation, the workpiece carriers 20 are picked up one by one from the top and transferred by the stack presentation device 18 to the feeding position 80 from where either individual workpieces 22 can be picked up by means of the loading device 24, or the whole workpiece carrier 20 can be taken over and transferred to the machining unit 12. After machining of the workpieces 22 in the machining unit 12, the individual workpieces 22 are deposited again on the workpiece carrier 20 by means of the loading device 24, or the empty workpiece carrier 20 is taken over again by the stack presentation device 18 in the feeding position 80 and re-stacked to the stack-presentation position 76. In this way, the individual workpiece carriers 20 are worked off one by one from top to bottom in the waiting position 78, and are finally stacked back to the stack-presentation position 76. When machining of the entire workpiece carrier stack 28 is finished, the stack can be transferred back to the loading area 40 by rotation of the rotary table 34 in the direction of arrow 82, with the loading doors 44 closed, whereby a workpiece carrier stack 28, that had been previously inserted into the rotary frame 54 in the loading area 40, is simultaneously transferred to the stack-presentation position 76 in the working area 14 so that continued operation is rendered possible without any loss of time. It is of course not a requirement that the same workpieces 22 of one kind be deposited again on the same workpiece carrier 20; rather, due to the machining time required for the workpieces 22, the workpieces 22 of one workpiece carrier 20 may be deposited on the next following workpiece carrier.

According to a variant of this method, the re-stacking operation from the stack-presentation position 76 to the waiting position 78 can be omitted so that individual workpiece carriers 20 can be picked up directly from the stack-presentation position 76 and transferred to the feeding position 80. In the feeding position 80 only part of the workpieces 22 are withdrawn and deposited again on the workpiece carrier 20 after machining in the machining unit 12. The workpiece carrier 20 is then deposited in the waiting position 78. Thereafter, the remaining workpiece carriers 20 are picked up from the stack-presentation position 76, transferred to the feeding position 80, whereafter part of the workpieces 22 are machined and finally deposited in the waiting position 78 until all workpiece carriers 20 have been re-stacked to the waiting position 78. Conveniently, the last workpiece carrier 20 is in this case immediately worked off in full, and then re-stacked to the waiting position 76. Then the remaining workpiece carriers 20 are picked up from the waiting position 78, moved to the feeding position 80 and, after machining of the remaining workpieces 22, re-stacked to the stack-presentation position 76. This step can then again be followed by the exchange of the workpiece carrier stack 28 by rotation of the rotary table 34 by 180°, as described above.

It is further possible, by the adoption of a special operating sequence for the withdrawal and feeding of machined and unmachined workpieces, in combination with the function of the stack-changing unit 26 and the stack presentation device 18, to ensure that even when different types of workpieces are present on successive workpiece carrier stacks all workpieces of a given type will be deposited on the same workpiece carrier stack after machining.

I claim:

1. Handling system for feeding workpieces to a subsequent machining unit, said handling system comprising:

a working area which is enclosed toward the outside by a protective wall;

a stack-changing unit for feeding workpiece carrier stacks comprising unmachined workpieces into said working area and for removing workpiece carrier stacks comprising machined workpieces from said working area, said stack-changing unit including; a first area arranged within said working area;

a second area arranged outside said working area forming a loading space accessible from outside; and a moving means for transferring workpiece carrier stacks between said first and said second areas, said moving means including a rotary table having a vertically extending axis, and being rotatable for transferring the workpiece carriers between said first and second areas;

a stack presentation device arranged within said working area and adapted for moving workpiece carrier stacks between said first area inside said working area and a buffer area inside said working area; and a loading device arranged transferable between said stack presentation device and said machining unit for transferring unmachined workpieces from said stack presentation device to said machining unit and for receiving machined workpieces from said machining unit and for transferring said machined workpieces to said stack presentation device.

2. Handling system according to claim 1, wherein said loading device is adapted to transfer workpiece carriers between said machining unit and said stack presentation device.

3. Handling system according to claim 1, wherein the rotary table comprises a section of said protective wall which is arranged between said first and second areas and mounted for rotation with said rotary table.

4. Handling system according to claim 1, wherein the loading space is separated from the outside by a second protective wall comprising at least one loading door through which workpiece carrier stacks can be loaded and unloaded, and wherein said rotary table engages with locking means so that said loading door can be opened from the outside only in a closed condition of said protective wall section.

5. Handling system according to claim 4, wherein said stack presentation device, said stack-changing unit, said protective wall and the second protective wall are mounted on a common frame.

6. Handling system according to claim 5, wherein said loading device is mounted on said frame and is configured as a loading gantry or a robot.

7. Handling system according to claim 1, wherein said stack-changing unit further comprises trolleys for supporting said workpiece carrier stacks, and wherein said trolleys can be displaced on the floor between said first and second areas when rotating said rotary table.

8. Handling system according to claim 7, wherein said rotary table is configured as an H-shaped rotary frame comprising a common central section and two U-shaped sections projecting from said central section into opposite directions.

9. Handling system according to claim 1, further comprising means for introducing and for removing single workpieces from said working area.

10. Handling system according to claim 1, further comprising a device for treating or processing workpieces which is arranged within said working area.

11. Handling system according to claim 1, wherein said loading device is coupled to a plurality of machining units.

12. Handling system according to claim 1, wherein said machining unit is configured as a storage unit for storing unmachined workpieces or workpiece carriers carrying unmachined workpieces.

13. Handling system for feeding workpieces to a subsequent machining unit, said handling system comprising:

a working area which is enclosed toward the outside by a protective wall;

a stack-changing unit for feeding workpiece carrier stacks comprising unmachined workpieces into said working area and for removing workpiece carrier stacks comprising machined workpieces from said working area, said stack-changing unit including; a first area arranged within said working area;

a second area arranged outside said working area forming a loading space accessible from outside; and a moving means for transferring workpiece carrier stacks between said first and said second areas;

a stack presentation device arranged within said working area and adapted for moving workpiece carrier stacks between said first area inside said working area and a buffer area inside said working area, said stack presentation device being configured as a pallet transfer device comprising an extension arm that can be moved in vertical and in horizontal directions, with a first link on which a second link is drivingly and positively coupled in such a way that when said first link is rotated, a free end of said second link describes a path comprised of essentially linear horizontal and vertical sections; and a loading device arranged transferable between said stack presentation device and said machining unit for transferring unmachined workpieces from said stack presentation device to said machining unit and for receiving machined workpieces from said machining unit and for transferring said machined workpieces to said stack presentation device.

14. Method of handling workpieces comprising the following steps:

(a) feeding a plurality of workpiece carriers, comprising unmachined workpieces stacked one on top of the other, to a loading/unloading position of a stack-changing unit;

(b) transferring the stacked workpiece carriers by means of said stack-changing unit from said loading/unloading position to a stack-presentation position for a subsequent stack presentation device, said stacked workpiece carriers being transferred between said loading/unloading position and said stack-presentation position by rotation about a vertical axis;

(c) re-stacking all workpiece carriers from said stack-presentation position of said stack presentation device to a waiting position of said stack presentation device in a free location;

(d) picking up a workpiece carrier from said waiting position and transferring it to a feeding position for a loading device;

(e) utilizing said loading device for transferring a workpiece from said feeding position to a subsequent machining unit;

(f) utilizing said stack presentation device for picking up said workpiece from said loading device in said feeding position upon completion of the machining operation;

(g) repeating steps (e) to (f) until all workpieces provided on a workpiece carrier have been worked off;

(h) transferring said workpiece carrier, comprising said machined workpieces to said stack-presentation position of said stack-changing unit;

(i) repeating steps (d) to (h) until all workpiece carriers have been re-stacked from said waiting position to said stack-presentation position; and (j) transferring said workpiece carriers comprising said machined workpieces from said stack-presentation position to said loading/unloading position of said stack-changing unit.

15. Method according to claim 14, wherein said loading device is utilized for taking over said workpieces from said workpiece carriers in said feeding position and for transferring to a subsequent unit for machining or storage, and wherein said workpiece carriers are re-stacked to said stack-presentation position when in an empty condition.

16. Method according to claim 14, wherein a subsequent unit for machining or storage is utilized for taking over said workpieces from said loading device in said feeding position, and wherein previously empty workpiece carriers are stacked back to said stack-presentation position in an at least partly filled condition.

17. Method according to claim 14, wherein said loading device is coupled to a plurality of units for machining or storage to which said workpieces are selectively supplied.

18. Method according to claim 14, wherein said workpiece carriers are moved on trolleys within said stack-changing unit.

19. Method of handling workpieces comprising the following steps:

(a) feeding a plurality of workpiece carriers comprising unmachined workpieces stacked one on top of the other, to a loading/unloading position of a stack-changing unit;

(b) transferring said stacked workpiece carriers from said loading/unloading position to a stack-presentation position for a subsequent stack presentation device, said stacked workpiece carriers being transferred between said loading/unloading position and said stack-presentation position by rotation about a vertical axis;

(c) re-stacking all workpiece carriers from said stack-presentation position and transferring them to a feeding position for a loading device;

(d) utilizing said loading device for transferring a workpiece to a subsequent machining unit;

(e) utilizing said stack presentation device for picking up said workpiece from said loading device in said feeding position upon completion of the machining operation;

(f) repeating steps (d) to (e) until part of said workpieces have been worked off;

(g) transferring said workpiece carrier comprising said workpieces, part of which have already been machined, to a waiting position of said stack-changing unit;

(h) repeating steps (c) to (g) until all workpiece carriers have been re-stacked from the stack-presentation position to said waiting position;

(i) picking up a workpiece carrier from said waiting position and transferring it to said feeding position for said loading device;

(j) utilizing said loading device for transferring a workpiece to said subsequent machining unit;

(k) utilizing said stack-presentation device for picking up said workpiece from said loading device in said feeding position upon completion of the machining operation;

(l) repeating steps (j) to (k) until all workpieces of a workpiece carrier have been machined;

(m) transferring said workpiece carrier comprising machined workpieces from said feeding position to said stack-presentation position;

(n) repeating steps (i) to (m) until all workpiece carriers have been stacked back from the waiting position to said stack-presentation position; and (o) transferring said workpiece carriers comprising machined workpieces from said stack-presentation position to said loading/unloading position of said stack-changing unit.

20. Method according to claim 19, wherein said loading device is utilized for taking over said workpieces from said workpiece carriers in said feeding position and for transferring to a subsequent unit for machining or storage, and wherein said workpiece carriers are re-stacked to said stack-presentation position when in an empty condition.

21. Method according to claim 19, wherein a subsequent unit for machining or storage is utilized for taking over said workpieces from said loading device in said feeding position, and wherein previously empty workpiece carriers are stacked back to said stack-presentation position in an at least partly filled condition.

22. Method according to claim 19, wherein said loading device is coupled to a plurality of units for machining or storage to which said workpieces are selectively supplied.

23. Method according to claim 19, wherein said workpiece carriers are moved on trolleys within said stack-changing unit.

24. Method of handling workpieces comprising the following steps:

(a) feeding a plurality of workpiece carriers, comprising unmachined workpieces stacked one on top of the other, to a loading/unloading position of a stack-changing unit;

(b) utilizing said stack-changing unit for transferring said stacked workpiece carriers from said loading/unloading position to a stack-presentation position for a subsequent stack presentation device, said stacked workpiece carriers being transferred between said loading/unloading position and said stack-presentation position by rotation about a vertical axis;

(c) re-stacking all workpiece carriers from said stack-presentation position of said stack presentation device to a waiting position of said stack presentation device in a free location;

(d) picking up a workpiece carrier for said waiting position and transferring it to a feeding position for a loading device;

(e) utilizing said loading device for transferring a workpiece from said feeding position to a subsequent machining unit;

(f) utilizing said stack presentation device for picking up the workpiece carrier from said loading device in said feeding position upon completion of the machining operation;

(g) transferring said workpiece carrier comprising said machined workpieces to said stack-presentation position of said stack-changing unit;

(h) repeating steps (d) to (g) until all workpiece carriers have been re-stacked from said waiting position to said stack-presentation position; and (i) transferring said workpiece carriers comprising said machined workpieces from said stack-presentation position to said loading/unloading position of said stack-changing unit.

25. Method according to claim 24, wherein said loading device is utilized for taking over said workpieces from said workpiece carriers in said feeding position and for transferring to a subsequent unit for machining or storage, and wherein said workpiece carriers are re-stacked to said stack-presentation position when in an empty condition.

26. Method according to claim 24, wherein a subsequent unit for machining or storage is utilized for taking over said workpieces from said loading device in said feeding position, and wherein previously empty workpiece carriers are stacked back to said stack-presentation position in an at least partly filled condition.

27. Method according to claim 24, wherein said loading device is coupled to a plurality of units for machining or storage to which said workpieces are selectively supplied.

28. Method according to claim 24, wherein said workpiece carriers are moved on trolleys within said stack-changing unit.

29. Method of handling workpieces comprising the following steps:

(a) feeding a plurality of workpiece carriers, comprising unmachined workpieces stacked one on top of the other, to a loading/unloading position of a stack-changing unit;

(b) utilizing said stack-changing unit for transferring said stacked workpiece carriers from said loading/unloading position to a stack-presentation position for a subsequent stack presentation device, said stacked workpiece carriers being transferred between said loading/unloading position and said stack-presentation position by rotation about a vertical axis;

(c) picking up a workpiece carrier from said stack-presentation position and transferring it to a feeding position for a loading device;

(d) utilizing said loading device for transferring a workpiece carrier from said feeding position to a subsequent machining unit;

(e) utilizing said stack presentation device for picking up said workpiece carrier from said loading device in said feeding position upon completion of the machining operation;

(f) transferring said workpiece carrier comprising said machined workpieces to a waiting position of said stack-changing unit;

(g) repeating steps (c) to (f) until all workpiece carriers have been re-stacked from said stack-presentation position to said waiting position;

(h) re-stacking all workpiece carriers from said waiting position to said stack-presentation position; and (j) transferring said workpiece carriers comprising said machined workpieces from said stack-presentation position to said loading/unloading position of said stack-changing unit.

30. Method according to claim 29, wherein said loading device is utilized for taking over said workpieces from said workpiece carriers in said feeding position and for transferring to a subsequent unit for machining or storage, and wherein said workpiece carriers are re-stacked to said stack-presentation position when in an empty condition.

31. Method according to claim 29, wherein a subsequent unit for machining or storage is utilized for taking over said workpieces from said loading device in said feeding position, and wherein previously empty workpiece carriers are stacked back to said stack-presentation position in an at least partly filled condition.

32. Method according to claim 29, wherein said loading device is coupled to a plurality of units for machining or storage to which said workpieces are selectively supplied.

33. Method according to claim 29, wherein said workpiece carriers are moved on trolleys within said stack-changing unit.

* * * * *

UNITED STATES PATENT AND TRADEMARK OFFICE
CERTIFICATE OF CORRECTION

PATENT NO. : 5,536,137
DATED : July 16, 1996
INVENTOR(S) : Helmut Jäger It is certified that error appears in the above-identified patent and that said Letters Patent is hereby corrected as shown below:

On the cover of the published patent after
[73] Assignee: Felsomat GmbH & Co. KG, replace "Donigsbach-Stein, Germany" with

--Königsbach-Stein, Germany--.

Signed and Sealed this

Seventeenth Day of December, 1996

Attest:

BRUCE LEHMAN

*Attesting Officer*        *Commissioner of Patents and Trademarks*